US011410546B2

United States Patent
Lee et al.

(10) Patent No.: US 11,410,546 B2
(45) Date of Patent: *Aug. 9, 2022

(54) BIRD'S EYE VIEW BASED VELOCITY ESTIMATION

(71) Applicant: TOYOTA RESEARCH INSTITUTE, INC., Los Altos, CA (US)

(72) Inventors: Kuan-Hui Lee, San Jose, CA (US); Matthew T. Kliemann, Ann Arbor, MI (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 16/876,699

(22) Filed: May 18, 2020

(65) Prior Publication Data

US 2021/0358296 A1    Nov. 18, 2021

(51) Int. Cl.
*G06T 7/00* (2017.01)
*G08G 1/01* (2006.01)
(Continued)

(52) U.S. Cl.
CPC ....... *G08G 1/0116* (2013.01); *B60W 60/0011* (2020.02); *B60W 60/00272* (2020.02);
(Continued)

(58) Field of Classification Search
CPC ............ G08G 1/0116; B60W 60/0011; B60W 60/00272; G06K 9/6259; G06T 7/246;
(Continued)

(56) References Cited

U.S. PATENT DOCUMENTS 9,558,564 B1    1/2017 Korchev
10,444,759 B2    10/2019 Douillard
(Continued)

OTHER PUBLICATIONS

Wirges, Sascha et al., Self-Supervised Flow Estimation using Geometric Regularization with Applications to Camera Image and Grid Map Sequences, arXiv:1904.12599v1 [cs.CV] Apr. 17, 2019, 6 pages.

(Continued)

*Primary Examiner* — Ping Y Hsieh
(74) *Attorney, Agent, or Firm* — Sheppard, Mullin, Richter & Hampton LLP; Hector A. Agdeppa; Daniel N. Yannuzzi

(57) ABSTRACT

Systems and methods determining velocity of an object associated with a three-dimensional (3D) scene may include: a LIDAR system generating two sets of 3D point cloud data of the scene from two consecutive point cloud sweeps; a pillar feature network encoding data of the point cloud data to extract two-dimensional (2D) bird's-eye-view embeddings for each of the point cloud data sets in the form of pseudo images, wherein the 2D bird's-eye-view embeddings for a first of the two point cloud data sets comprises pillar features for the first point cloud data set and the 2D bird's-eye-view embeddings for a second of the two point cloud data sets comprises pillar features for the second point cloud data set; and a feature pyramid network encoding the pillar features and performing a 2D optical flow estimation to estimate the velocity of the object.

20 Claims, 7 Drawing Sheets

(51) Int. Cl.
*G06T 7/246* (2017.01)
*B60W 60/00* (2020.01)
*G06K 9/62* (2022.01)

(52) U.S. Cl.
CPC ............ *G06K 9/6259* (2013.01); *G06T 7/246* (2017.01); *G06T 2207/10028* (2013.01); *G06T 2207/20081* (2013.01); *G06T 2207/20084* (2013.01)

(58) Field of Classification Search
CPC . G06T 2207/10028; G06T 2207/20081; G06T 2207/20084
See application file for complete search history.

(56) References Cited

U.S. PATENT DOCUMENTS

| | | | | |
|---|---|---|---|---|
| 2014/0334685 | A1* | 11/2014 | Chen | G06T 7/246 382/107 |
| 2019/0145765 | A1 | 5/2019 | Luo | |
| 2020/0160487 | A1* | 5/2020 | Kanzawa | G06K 9/00369 |
| 2021/0201578 | A1* | 7/2021 | Chaudhuri | G06T 19/00 |
| 2021/0358137 | A1* | 11/2021 | Lee | G06N 20/00 |

OTHER PUBLICATIONS

Dai, Qi et al., Self-supervised Object Motion and Depth Estimation from Video, arXiv:1912.04250v1 [cs.CV] Dec. 9, 2019, 10 pages.

Cao, Zhe et al., Learning Independent Object Motion from Unlabelled Stereoscopic Videos, Proceedings of the IEEE/CVF Conference on Computer Vision and Pattern Recognition (CVPR), 2019, pp. 5594-5603.

Wu, Wenxuan et al., PointPWC-Net: A Coarse-to-Fine Network for Supervised and Self-Supervised Scene Flow Estimation on 3D Point Clouds, arXiv:1911.12408v1 [cs.CV] Nov. 27, 2019, 10 pages.

Meister, Simon et al., UnFlow: Unsupervised Learning of Optical Flow with a Bidirectional Census Loss, leadarXiv:1711.07837v1 [cs.CV] Nov. 21, 2017, 9 pages.

Wiles, Olivia et al., Self-supervised learning of a facial attribute embedding from video, arXiv:1808.06882v1 [cs.CV] Aug. 21, 2018, pp. 1-15.

* cited by examiner

BIRD'S EYE VIEW BASED VELOCITY ESTIMATION

TECHNICAL FIELD

The present disclosure relates generally to velocity estimation, and in particular, some implementations may relate to converting point cloud information into a two dimensional form for velocity estimation.

DESCRIPTION OF RELATED ART

Deploying autonomous vehicles (AVs) is a technologically complex challenge. Among other challenges, AVs need to accurately detect and track moving objects such as vehicles, pedestrians, and cyclists in realtime. In autonomous driving, accurately estimating the state of surrounding obstacles is critical for safe and robust path planning. However, this perception task is difficult, particularly for generic obstacles, due to appearance and occlusion changes. Perceptual errors can manifest as braking and swerving maneuvers that can be unsafe and uncomfortable. Many contemporary autonomous driving systems utilize a "detect then track" approach to perceive the state of objects in the environment. This approach has strongly benefited from recent advancements in 3-D object detection and state estimation. However, this approach often suffers errors as it relies on geometric consistency of the object detection results over time. These errors can include: False negatives, or failing to produce detection where an obstacle exists; false positives, or hallucinating an obstacle where none exists; a limited predefined ontology of detectable object classes resulting in certain types of obstacles, such as guardrails or road debris, not being directly recognized (while another module may handle detection of these obstacles, it often lacks the priors needed to represent these obstacle consistently for tracking purposes); observing a dynamic scene from a moving platform requiring the system to cope with changing viewpoints and occlusions, which may result in temporally inconsistent detections of the same object leading to false motion estimates (e.g., perceptual aliasing of a long guardrail can often create hallucinated motion); and obstacle kinematic models used in object tracking can further compound the problem, causing failed or incorrect associations, particularly when the state initialization is poor.

To estimate motion in the surrounding world, conventional solutions have estimated scene flow directly from LIDAR sweeps. Some techniques formulate the rigid scene flow estimation by an energy minimization along with SHOT feature descriptors. Others use a learning based flow estimation by training encoding network to extract features from point cloud grids.

Some solutions rely on the depth image representation for flow estimation, using a LIDAR-generated depth image representation with a convolutional neural network (CNN) to estimate the motion of the surrounding vehicles. Others introduce a 3-D scene flow approach built on the top of FlowNet to compute point cloud images for dense 3-D flow prediction.

Unstructured data representation has also been applied to scene flow estimation. Some have proposed an end-to-end deep network to fuse features from unstructured point clouds from two consecutive LIDAR sweeps. Others have proposed a parametric continuous convolution layer for non-grid structured data, and demonstrated the applications in point cloud segmentation and LIDAR motion estimation. Still others propose using FlowNet3D, which builds on PointNet++, leveraging a flow embedding layer to fuse two consecutive LIDAR sweeps. Extensions of this use additional geometric loss functions beyond L2 distance (Point to Plane and Cosine Distance) and develop a new evaluation by looking at the 3D reconstruction quality of dynamic models. It has also been proposed to use PointFlowNet to jointly train the tasks of 3-D scene flow, rigid motion prediction and 3D object detection from unstructured LIDAR data.

Recent solutions have used a self-supervised mechanism leveraging geometric loss constraints for 3-D scene flow estimation. Others propose an adaptation of the PWCNet architecture for 3-D scene flow estimation trained in a self-supervised way.

Occupancy grid maps (OGMs) are widely used to represent scene obstacle occupancy for robotics applications. In some solutions a deep tracking framework incorporates a simple recurrent neural network (RNN) to learn OGM-to-OGM mappings. A 2-D BeV flow estimator can be formulated as a similarity learning problem by transferring 3D OGM into 2-D grids of embedding. A separate classifier removes background cells and the remaining foreground cells are matched between frames using an expectation maximization algorithm. The RNN technique can be extended by using a spatial transformer module and dilated gated recurrent units instead of a simple RNN to account for observations from a moving platform. These employ a self-supervised training scheme to use the un-occluded portions of future frames as training examples. A learned approach to determine a motion mask on an OGM using hand crafted input features such as mean intensity and height range of points falling within each cell, rather than raw point clouds, can also be used.

Estimation of the per cell motion state within an occupancy grid is a recent advancement. These are typically referred to as dynamic occupancy grid maps (DOGMa). Online versions typically model this state using particle filtering. One implementation of DOGMa uses a particle filtering scheme. Various methods have also been proposed to cluster and extract obstacle level representations from a DOGMa for multiple object tracking. Various deep learning works build on the DOGMa representation for various tasks. One augments the DOGMa with a recurrent network trained by self-supervised labeling to predict future states. Another builds upon the Dynamic Occupancy Grid to do semantic segmentation of the DOGMa internal per cell state as static or dynamic.

BRIEF SUMMARY OF THE DISCLOSURE

Embodiments may be implemented to provide an end-to-end deep learning framework for LIDAR-based flow estimation using a bird's eye view (BeV). Embodiments may use consecutive point cloud pairs as input data sets and produce a 2-D BeV "flow" grid describing the dynamic state of each cell. Experimental results show that the proposed system not only estimates 2-D BeV flow accurately but also improves tracking performance of both dynamic and static objects.

In some embodiments, a method for determining velocity of an object associated with a three-dimensional (3D) scene may include: receiving two sets of 3D point cloud data of the scene from two consecutive point cloud sweeps; aligning the two consecutive point cloud data sets into the same coordinate frame; encoding data of the point cloud data sets using a pillar feature network to extract two-dimensional (2D) bird's-eye-view embeddings for each of the point cloud data sets in the form of pseudo images, wherein the 2D bird's-eye-view embeddings for a first of the two point cloud data sets may include pillar features for the first point cloud data set and the 2D bird's-eye-view embeddings for a second of the two point cloud data sets may include pillar features for the second point cloud data set; and encoding the pillar features using a feature pyramid network and performing a 2D optical flow estimation to estimate the velocity of the object.

In other embodiments, a system for determining velocity of an object associated with a three-dimensional (3D) scene, the system may include: a non-transitory memory configured to store instructions; at least one processor configured to execute the instructions to perform the operations of: receiving two sets of 3D point cloud data of the scene from two consecutive point cloud sweeps; aligning the two consecutive point cloud data sets into the same coordinate frame; encoding data of the point cloud data sets using a pillar feature network to extract two-dimensional (2D) bird's-eye-view embeddings for each of the point cloud data sets in the form of pseudo images, wherein the 2D bird's-eye-view embeddings for a first of the two point cloud data sets may include pillar features for the first point cloud data set and the 2D bird's-eye-view embeddings for a second of the two point cloud data sets may include pillar features for the second point cloud data set; and encoding the pillar features using a feature pyramid network and performing a 2D optical flow estimation to estimate the velocity of the object.

In further embodiments, a system for determining velocity of an object associated with a three-dimensional (3D) scene, the system may include: a pillar feature network to receive two sets of 3D point cloud data of the scene from two consecutive point cloud sweeps, and to encode data of the point cloud data to extract two-dimensional (2D) bird's-eye-view embeddings for each of the point cloud data sets in the form of pseudo images, wherein the 2D bird's-eye-view embeddings for a first of the two point cloud data sets may include pillar features for the first point cloud data set and the 2D bird's-eye-view embeddings for a second of the two point cloud data sets may include pillar features for the second point cloud data set; and a feature pyramid network to encode the pillar features and performing a 2D optical flow estimation to estimate the velocity of the object.

The systems and methods may further include applying a contextual network to use contextual information to refine the velocity estimate. The context network may be a feed-forward CNN based on dilated convolutions.

Receiving two sets of 3D point cloud data of the scene may include receiving the first point cloud data set by a first pillar feature network and receiving a second point cloud data set by a second pillar feature network, wherein the first point cloud data set represents the scene at a time t−1 and the second point cloud data set represents the scene at a time t subsequent to the time t−1.

Encoding data of the point cloud data sets may include voxelizing the point cloud data sets to render surfaces in the data sets onto a grid of discretized volume elements in a 3D space to create a set of pillars.

The set of pillars may include a (D, P, N) shape tensor in which P is the number of pillars and N denotes the number of points per pillar.

The systems and methods may further include encoding voxel information from the voxelizing to extract the features of the point cloud data sets. The systems and methods may further include scattering the encoded features back to their original pillar locations to create the bird's-eye-view.

The 2D optical flow estimation may include warping the pseudo image of the first point cloud data set to align the pseudo image of the first point cloud data set with the pseudo image of the second point cloud data set. The 2D optical flow estimation further may include computing a cost function of the warped pseudo image of the first point cloud data set and the pseudo image of the second point cloud data set, by identifying displacement of a feature from the first image to the second image. The 2D optical flow estimation further may include using the cost function to estimate the flow of the object.

Performing a 2D optical flow estimation to estimate the velocity of the object may include aggregating bird's eye view motion vectors to compute a single mean velocity and co-variance for each obstacle cluster. A sample may be weighted based on an occupancy probability of the cell to which the sample belongs.

The estimated velocity of the object may be a 2-D flow vector for the object.

The systems and methods may further include using annotated track cuboids to auto-generate the 2D flow in multiple scales. The systems and methods may further include performing flow estimation only on labeled dynamic objects and not performing flow estimation on non-labeled obstacles or background objects.

The systems and methods may be performed using three or more sets of 3D point cloud data of the scene, including aligning all of the point cloud data sets into the same coordinate frame, encoding data of each of the point cloud data sets using a pillar feature network to extract two-dimensional (2D) bird's-eye-view embeddings for each of the point cloud data sets comprising pillar features for each point cloud data set, and encoding the pillar features using a feature pyramid network and performing a 2D optical flow estimation to estimate the velocity of the object.

Encoding the pillar features using a feature pyramid network further includes using 2D map information as an additional channel input to the feature pyramid network.

The systems and methods may further include filtering the point cloud datasets using a ground height map, wherein the filtering may include comparing data point heights against ground height and discarding a data point whose point height is not greater than the ground height at the point's location.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
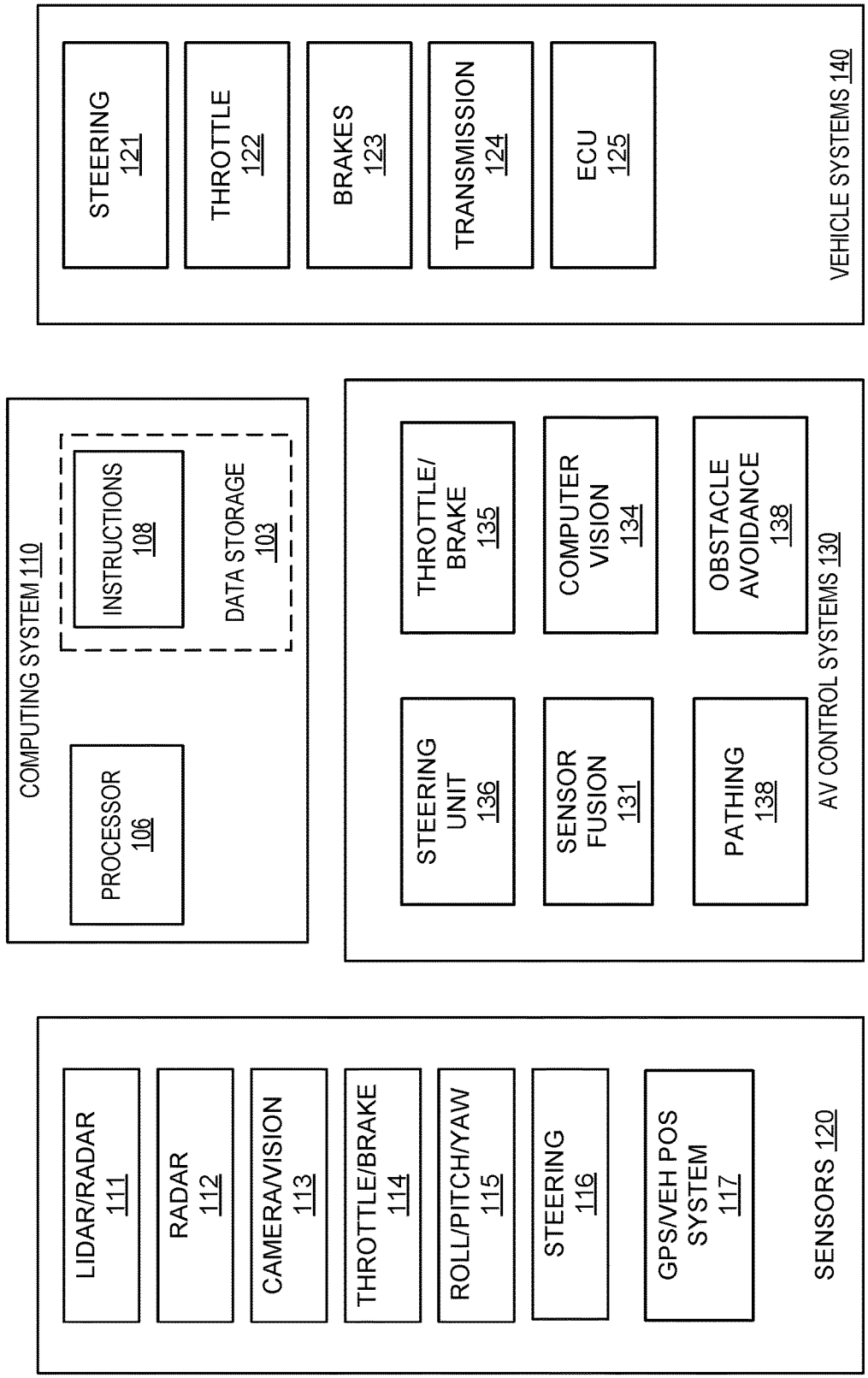
FIG. 1 illustrates an example autonomous or semi-autonomous vehicle with which embodiments of the disclosed technology may be implemented.

The figures are not exhaustive and do not limit the present disclosure to the precise form disclosed.

DETAILED DESCRIPTION

Embodiments of the systems and methods disclosed herein can provide a LIDAR-based scene motion estimator decoupled from object detection. Embodiments may be implemented to use two or more consecutive full LIDAR point cloud sweeps as inputs, and encode each LIDAR sweep into a 2-D BeV representation of feature vectors using a pillar feature extractor. Then, the two or more BeV feature grids are inputted to an optical flow network. The final output is a 2-D flow vector for each cell. Because of the computational efficiencies, embodiments may be feasible for deployment to a robotic system, as opposed to prior methods.

Embodiments implement a 2-D BeV representation over a 3-D or projective representation (depth image) for multiple reasons. Primarily, for autonomous driving, motion occurring in the x-y plane is important, particularly for motion planning. Second, the Euclidean representation allows developers to design the network architecture to account for expected relative scene motion. Additionally, a 2-D representation provides computational efficiency compared to 3-D approaches and allows the system to share the encoded feature representation with an object detection network.

Embodiments may use a systematic end-to-end method to effectively estimate the 2-D motion for an entire scene in LIDAR BeV imagery, without prior removal of ground returns. The system may leverage contextual knowledge of the scene but still generalize it to properly estimate the motion of unseen object types.

The BeV motion results can be integrated into, and used to improve, object tracking performance, not only in a public dataset, but also in a real-world autonomous driving platform. Embodiments may also be implemented to estimate ego vehicle motion (motion of the host/subject vehicle), such as between frames, and may leverage supervision of the inertial navigation sensor.

Embodiments disclosed herein estimate velocity in 2-D BeV grids by combining a Pillar Feature Network (PFN) with an optical flow network. In some embodiments, two consecutive point cloud sweeps are aligned into the same coordinate frame; in other words, the coordinate of LIDAR sweep at t−1 will be transferred to the coordinate of LIDAR sweep at t using the odometry information of the robot. Next, two point clouds are encoded by the PFN to build two BeV pseudo-images where each cell has a learned embedding based on points that had fallen inside of it. Then the two pseudo images are fed to a feature pyramid network and an optical flow network for dense flow estimation. Embodiments may also provide 2-D map information (e.g., BeV on- or off-road image) as an additional channel input to the feature pyramid network. Sensor fusion can enhance performance by using inputs from other data sources. For example, embodiments may further leverage radar data as an additional input channel to the feature pyramid network, which may include range, range-rate (velocity) and occupancy information from the radar return signal.

The systems and methods disclosed herein may be implemented for use in scene flow estimation for robotics, autonomous vehicles and other automated technologies. In the case of autonomous vehicles, embodiments may be implemented for any of a number of different autonomous or semi-autonomous vehicles and vehicle types to perform flow estimation for surrounding objects or for the host (ego) vehicle itself. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include LIDAR 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as LIDAR 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensors 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Embodiments for deep learning for image perception utilize synthetic data, such as data generated programmatically. Synthetic data may include computer-generated data created to mimic real data. Embodiments may be implemented to disentangle the components of the data set, and perform multiple iterations.

Figure 2:
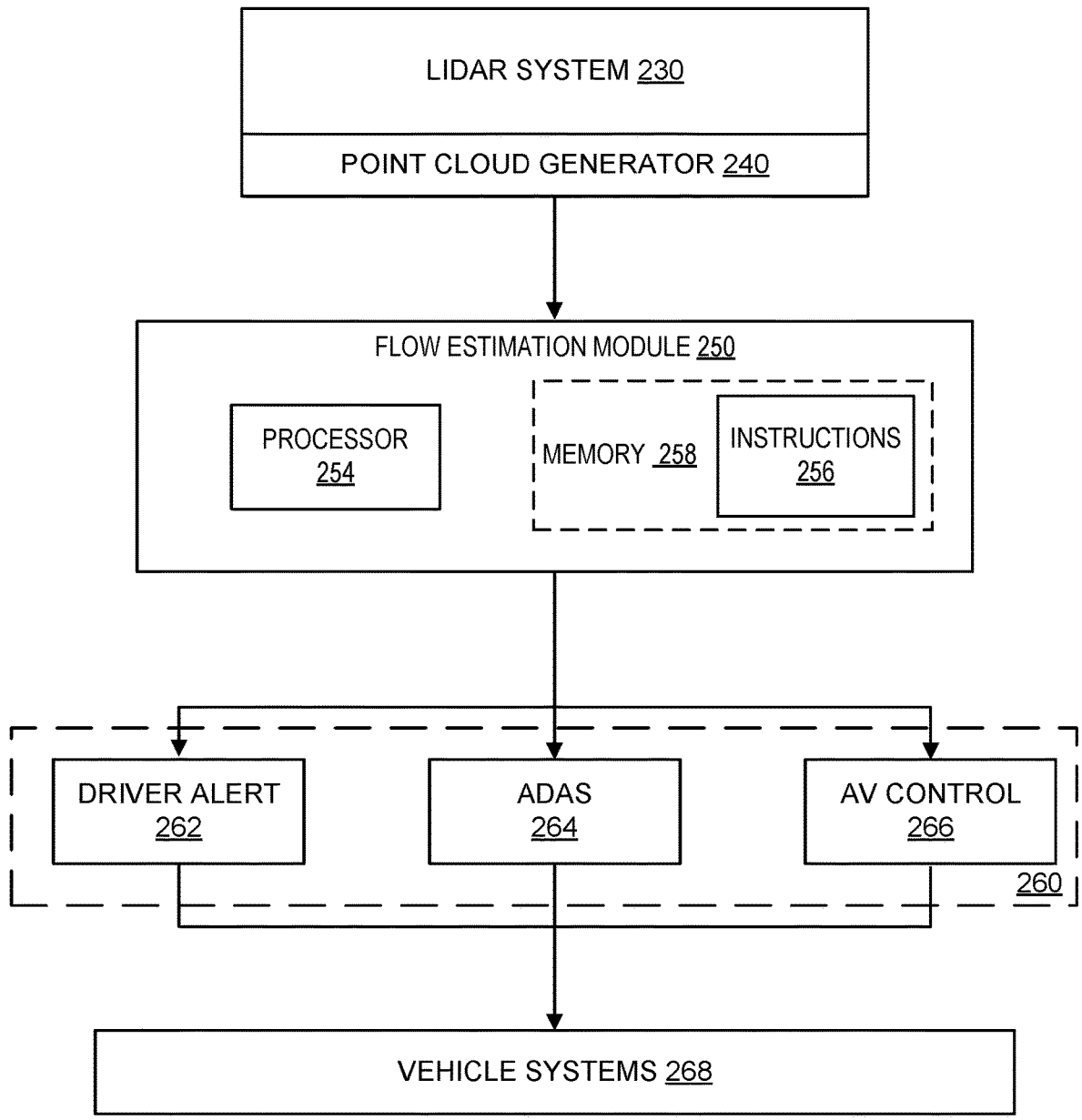
FIG. 2 illustrates an example system for BeV flow estimation in accordance with various embodiments of the systems and methods disclosed herein.

FIG. 2 illustrates an example system for BeV flow estimation in accordance with various embodiments of the systems and methods disclosed herein. Referring now to FIG. 2, the example system includes a LIDAR system 230, a point cloud generator 240 (which may be part of LIDAR system 230, a flow estimation module 250, vehicle control modules 260, and vehicle systems 268. LIDAR system 230 includes light emitters and detectors to collect information surrounding the vehicle (or other robotics or automated system). In operation, LIDAR system 230 generates light beams, such as laser light beams, that are emitted in an arc up to 360° surrounding the vehicle. The transmitted light is reflected by objects in the environment of the vehicle and the reflections are returned to photodetectors of LIDAR system 230 where they are captured. The reflections are converted into electrical signals by any array of photodetectors, which can be implemented as photodiodes, avalanche photodiodes or other photodetectors systems. Timing information can be used to measure the time-of-flight of the optical signal from its source at LIDAR system 232 the object off of which it bounces and back to the photodetector where its reflection is received. This time-of-flight can be used to measure the distance from the vehicle (from LIDAR system 230) to the object. A 3D LIDAR system, therefore, can capture two-dimensional data using photodetectors arranged in rows and columns and the third dimension, distance, determined based on the time-of-flight. LIDAR system 230 can be implemented using any of a number of different LIDAR technologies including electromechanical LIDAR and solid-state LIDAR. LIDAR system 230 can be implemented and configured to provide the system with 360° of visibility about the subject vehicle. LIDAR system 230 can be implemented with a relatively high degree of accuracy (e.g., on the order of +/−2 cms).

Data from LIDAR system 230 can be used to generate three-dimensional maps and point clouds that can be used by the autonomous vehicle or other robotic or automated system to navigate it surrounding environment. The LIDAR system can provide information to determine the bounds of the lane, the presence and location of surrounding vehicles, pedestrians and other objects, the presence location of traffic signals, and so on. In addition to detecting the presence and location of objects, information from LIDAR system 230 can also be used to track obstacles and other objects like vehicles, pedestrians, and so on.

Data from LIDAR system 230 can be supplied to point cloud generator 240, but in some embodiments, point cloud generator 240 can be implemented as part of LIDAR system 230. Point cloud generator 240 can include a processing system or other circuit implemented to generate point clouds from the data collected sensors. Point clouds can comprise a set of 3D points corresponding to part of a scene or a whole scene and can be compensated by the vehicle motion during the accumulation period of the frame. Each frame can be instantaneously captured (such as, e.g., using flash lidar or a global shutter camera) or accumulated over a full rotation of a sensor. This data can include image sensor data from an array of image sensors at LIDAR system 230 as well as range data. Point cloud generator 240 can be implemented to collate the information collected from the image sensors to generate the three-dimensional point cloud map. For example, point cloud generator few hundred and 40 can be configured to stitch together image information collected from the rows and columns of image sensors of LIDAR system 230 along with the range information for each pixel. Deep learning algorithms can be trained and used to label point cloud data collected by LIDAR system 230. The point cloud can be stored in any of a number of different point cloud file formats such as those used for 3D modeling.

In operation, two or more point clouds (e.g., two, three, four or more point clouds) are provided to flow estimation module 250. In this example, flow estimation module 250 includes a processor 254 and memory 258. Processor 254 can include one or more GPUs, CPUs, microprocessors or any other suitable processing system. Processor 254 may include one or more single core or multicore processors. Processor 254 executes instructions 256 stored in a non-transitory computer readable medium, such as memory 258.

Memory 258 may contain data as well as instructions (e.g., program logic) executable by processor 254 to perform flow estimation. These instructions may also include instructions 256 to execute various functions of vehicle 100, including those of vehicle systems and subsystems. Memory 258 may contain additional instructions 256 as well, including instructions to transmit data to, receive data from, interact with, and/or control one or more of the sensors 120, AV control systems, 130 and vehicle systems 140. In addition to the instructions, memory 258 may store data and other information used by the vehicle and its systems and subsystems for operation, including operation of vehicle 100 in the autonomous, semi-autonomous or manual modes.

Although one flow estimation module 250 is illustrated in FIG. 2, in various embodiments flow estimation modules 250 can be included. In some embodiments, some or all of the functions of flow estimation module 250 may be implemented using a vehicle processing unit including, for example, an ECU or computing system 110.

Instructions 256 in memory 258 can be included to cause processor 254 to estimate flow using the point cloud data. Particularly, in one embodiment, the two point clouds are encoded by a pillar feature network to generate two-dimensional bird's-eye-view pseudo-images in which each cell includes a learned embedding based on points falling within that cell. Instructions 256 in memory 258 can be further configured to process the BeV pseudo-images using an optical flow network for flow estimation.

The output of flow estimation module 250 can include flow estimates for one or more objects surrounding the vehicle. These flow estimates can include, for example, velocity and trajectory information for other vehicles, pedestrians, and other objects around which the subject vehicle intends to navigate. This flow estimation information can be provided to one or more of a number of vehicle control modules 260 for vehicle control.

The flow estimates generated by flow estimation module 250 may be used by any of a number of vehicle systems such as for autonomous driving, obstacle avoidance, assisted driving, driver warnings or other alerts, and so on. The flow estimates in this example are provided to various vehicle control modules 260 that can control the vehicle fully or partially in the can provide appropriate warnings and alerts to the driver. For example, in terms of the example vehicle described with reference to FIG. 1, this information can be provided to computing system 110 for routing, obstacle avoidance, assisted driving, and other functions.

In the illustrated example, include autonomous vehicle (AV) control module 266, advanced driver assistance systems (ADAS) module 264 and driver alert module 262. In other embodiments, other vehicle control modules 260 may be included. Autonomous vehicle control module 266 can use the estimated flow information to operate the vehicle to avoid detected objects based on their estimated flow (e.g., given their estimated velocity and trajectory). This can include operating vehicle systems 268 such as throttle, steering and braking systems. ADAS module 264 can use the information for ADAS assistance systems available on a given vehicle to execute ADAS maneuvers depending on the flow control information. For example, ADAS module 264 can provide instructions to a vehicle braking system of vehicle systems 268 to initiate emergency braking to avoid a collision with an object. As another example, ADAS module 264 can provide instructions to a steering system to execute object avoidance maneuvers.

Flow estimation module 250 may also activate driver alert module 262 to provide one or more alerts to the driver of the subject vehicle. These alerts may include, for example, audible, visual or tactile alerts to provide alerts, data or other information to the driver in response to the estimated flow information. This information might include, for example, an alert to the driver of a wrong way vehicle, a vehicle on a collision course with the subject vehicle or other condition of which the driver of the subject vehicle should be aware.

Figure 3:
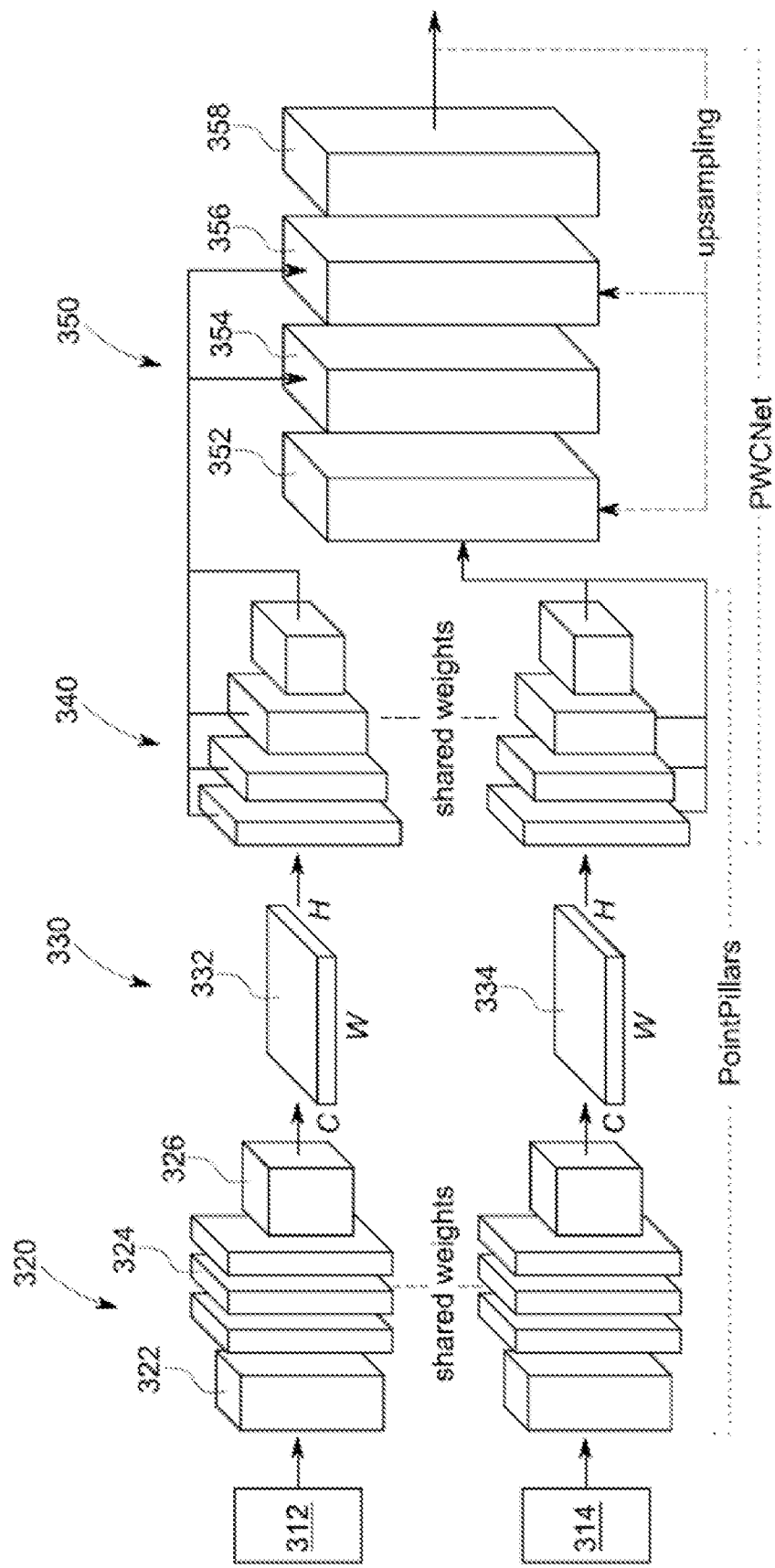
FIG. 3 illustrates an example architecture for BeV flow estimation in accordance with various embodiments of the systems and methods disclosed herein.
Figure 4:
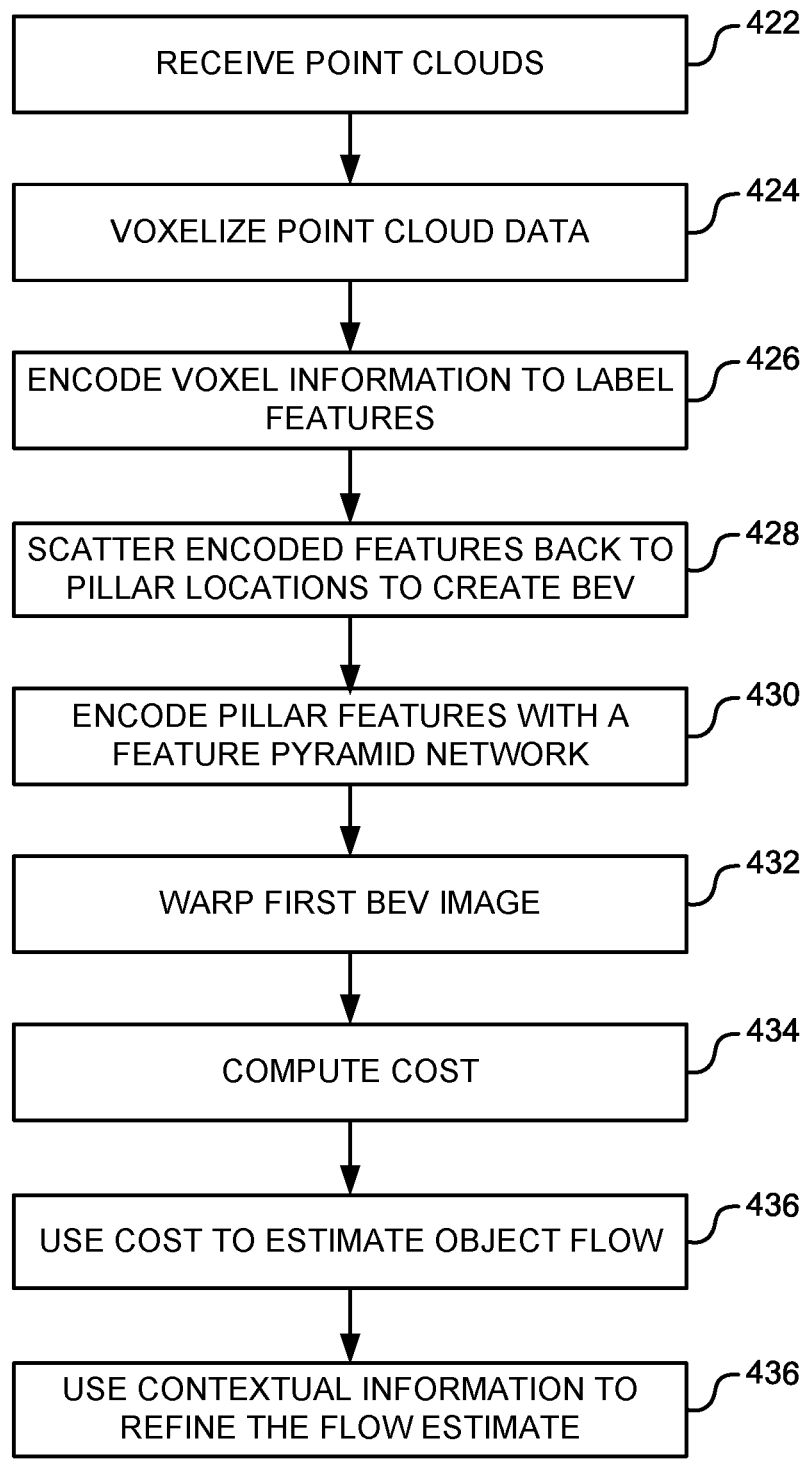
FIG. 4 illustrates an example process for BeV flow estimation in accordance with various embodiments of the systems and methods disclosed herein.

FIG. 3 illustrates an example architecture for BeV flow estimation in accordance with various embodiments of the systems and methods disclosed herein. FIG. 4 illustrates an example process for BeV flow estimation in accordance with various embodiments of the systems and methods disclosed herein. Referring now to FIGS. 3 and 4, an example process and architecture are now described. This example includes a pillar feature network 320, feature pyramid 340 and an optical flow network 350. In this example, the system includes two pillar feature networks 320 and two feature pyramids 340. In other implementations, a greater quantity of pillar feature networks 320 and feature pyramids 340 may be included to process a greater number of point clouds.

At operation 422, pillar feature network 320 receives a point cloud from the vehicle LIDAR unit and operates on the data to extract a two-dimensional Birds-eye View pseudo-image from the point cloud. In this example, a first point cloud 314 is received by one pillar feature network 320 and a second point cloud 312 is received by the other pillar feature network 320. The second point cloud 312 represents the scene surrounding the vehicle at a time t subsequent to the time t−1 of the scene represented by the first point cloud 314. In some embodiments, more than two point clouds can be used. Pillar feature network 320 in this example includes a voxelizer 322, a 3D classification and segmentation network 324 and a scatterplot generator 326.

In some embodiments, the point clouds can be filtered against a 2-D ground height map to reduce the data set. For example, a filtering algorithm can check to determine whether a point's z value (height) is greater than the ground height at that point's location, or greater than the ground height plus a predetermined margin. If the point's height is not greater than the ground height (or height plus margin), the point can be discarded.

At operation 424, voxelizer 322 may be implemented to receive 3D surfaces detected by the LIDAR system and render them onto a grid of discretized volume elements in a 3D space. A voxel comprises a volume element (e.g., a cube) representing a value of a 3D surface or solid geometric element at a point in the 3D space. In one embodiment, in operation, a processing engine receives a surface from the LIDAR system for voxelization. This can be implemented, for example, using processor 254. In another embodiment, the processing engine may be a dedicated hardware engine such as a specialized hardware unit in a GPU or an application specific integrated circuit (ASIC) configured to implement the voxelization algorithm. The processing engine maps the surface onto a plurality of voxels, which may be implemented as a grid (e.g., regularly spaced) of volumetric elements, such as cubic volumes arranged in a 3D array oriented along x, y, and z axes. The processing engine may then generate a value for each voxel in the plurality of voxels that intersects with the surface. In some embodiments, the value may be a scalar value, which may represent a value such as opacity (or transparency) for the voxel, or a vector value, which may represent, for example, a color for the voxel.

In some embodiments, voxelizer 322 discretizes the point clouds into an evenly spaced grid in a plane (e.g., in the x-y plane) creating a set of pillars. The point cloud features may be structured as a (D, P, N) shape tensor in which P is the number of pillars, N denotes the number of points per pillar. In the first dimension D=9 dimensional, the first four values denote coordinates x, y, z and reflectance r. The next five values denote the distances to the arithmetic mean $x_c$, $y_c$, $z_c$ of all points in a pillar and the offset $x_p$, $y_p$ from the pillar center. Otherwise, the pillars with too few points may be treated as empty pillars or omitted from processing, for reasons of computational efficiency.

At operation 426, 3D classification and segmentation network 324 encodes the voxel information. In some embodiments, 3D classification and segmentation network 324 may include a deep learning neural network that operates on the voxelized features to encode the voxel information and extract the features of the point cloud data sets. In some embodiments a feature is processed by a simplified version of PointNet to encode to shape (C, P, N) and further encoded to (C, P) by a max operation over the channels. One example of a pillar feature extractor that may be used is described by A. H. Lang, S. Vora, H. Caesar, L. Zhou, J. Yang, and O. Beijbom, in "Pointpillars: Fast encoders for object detection from point clouds," in Proceedings of the IEEE Conference on Computer Vision and Pattern Recognition, 2019, pp. 12 697-12 705.

In some embodiments, additional inputs to the voxelizer and classification and segmentation network may include sampled colors, semantic class and feature vectors of the point projected onto an overlapping camera frame. This may again provide a measure of sensor fusion using inputs from various sensors.

At operation 428, scatterplot generator 326 may be implemented to operate on the encoded features from 3D classification and segmentation network 324. Scatterplot generator 326 may be configured to scatter the encoded features back to their original pillar locations to create a pseudo-image tensor of shape (C, H, W), where H and W indicate the height and width of the pseudo-image. This pseudo-image tensor is the Birdseye view 330.

As indicated above, two pillar feature networks 320 are provided to operate on two separate point clouds 312, 314, which may be consecutive in time. This results in two birds-eye view images 332, 334 having 3-D embeddings (i.e., pillar features), one representing the first point cloud (e.g., the point cloud at time t−1) and one representing the second point cloud (e.g., the point cloud at time t). Where more than two point clouds are used to perform the flow estimation, a corresponding quantity of pillar feature networks can be provided to operate on the point clouds and generate birds-eye view images for each point cloud.

To associate the 3-D embeddings (i.e., pillar features) for each 2-D BeV grid 332, 334, the system may be configured to treat this problem as a 2-D optical flow estimation in BeV. Accordingly, model architecture parameters such as receptive field and correlation layer parameters may be used to account for the maximum relative motion that would be expected to be encountered between consecutive LIDAR sweeps, given the time delta between frames, grid resolution, and typical vehicle speeds. For example assume in one application that the maximum velocity of a vehicle encountered might be 30 m/s. Thus for oncoming traffic, it may be appropriate to account for a 60 m/s closing rate. Further assume a time between frames of 0.1 seconds. With such parameters, the system may be configured to account for up to 6 m of motion between frames. If the cell size is 0.25 m, then the corresponding cells between images can be +/−24 cells in position difference. Therefore, the network is ideally able to essentially search across this resolution. For example, +/−24 cells at the full resolution would correlate to +/−6 cells at the ¼ resolution.

At operation 430, the pillar features are further encoded via a feature pyramid network 340. Feature pyramid network 340 may be implemented as a feature extractor for object detection operating on a pyramid of features. Feature pyramid network 340 may include bottom-up and top-down pathways. The bottom-up pathway is the usual convolutional network for feature extraction. Moving up the bottom-up pathway, the spatial resolution decreases, but the semantic value for each layer increases. Moving down the top-down pathway, the spatial resolution increases, but the semantic value for each layer decreases.

Embodiments may also provide 2-D map information, such as BeV on- or off-road images from a map database as an additional channel input to the feature pyramid network. Sensor fusion can enhance performance by using inputs from other data sources as well. For example, embodiments may further leverage radar data as an additional input channel to the feature pyramid network. This may include range, range-rate (velocity) and occupancy information from the radar return signal.

The features extracted by feature pyramids 340 are provided to optical flow network 350. At operation 432, the first image (the image at time t−1) is warped by warping module 352. Warping module 352 adjusts the first image to align with the subsequent image (the image at time t) so that the features can be appropriately compared. Where more than two images are used, warping can be applied to all images corresponding to the time prior to t to align them with the most current image (the image at time t) so that the features can be compared across all images.

It should be noted that warping can be performed prior to running the network or within the network, and that the outputs may be different depending on where warping is performed. For example, in some embodiments if an external motion signal from an inertial navigation system is available, the pillars can be scattered to the same "global" positions in two frames such that the network is only estimating dynamic motion (i.e., static cells will output motion vectors of zero). In other embodiments, the system can be configured to center each pseudo image about the corresponding vehicle position for the cloud (for example, the t−1 image may be centered at (1,1) in world coordinates and the t image centered at (2,2) in world coordinates). The result of this is for cells in the output that correspond to non-moving objects, the estimated motion vector for that cell would be the host vehicle's ego-motion (i.e., self-motion) relative to that cell. Another step, such as Random Sample Consensus (RANSAC) for example, may be implemented, or another network head used to estimate the dx, dy, d-theta of the host vehicle between the frames. Embodiments may further be configured to use this approach to supervise with the network during training with the outputs of the inertial navigation system for free ground truth data.

At operation 434, the warped first image (and previous images, where applicable) and the second image are compared by a cost volume module 354 to determine differences between the images, where the matching cost, or cost function, is defined as the correlation between the two feature maps. Particularly, cost volume module 354 may be configured to identify displacement of a feature from the first image to the second image. The cost volume block may be implemented to use distance metrics such as correlation, normalized cross correlation and cosine distance to compare a candidate alignment. This information can be provided to flow estimator module 356 which, at operation 436 uses these differences to estimate the flow of the object. In some embodiments, the final output is a 2-D flow vector for each cell.

At operation 438, context network 358 may be applied to exploit contextual information for additional refinement. The context network may be implemented as a feedforward CNN. More particularly, in some embodiments this is implemented as a feedforward CNN based on dilated convolutions, having 7 convolutional layers with kernel size 3.

In some embodiments, the flow block (comprising warping, cost volume, and flow estimation) can be implemented to occur at multiple working resolutions and can be chained together. For example, in the above example, if the true motion at full resolution is +23 cells, then the ¼ resolution flow block might estimate +5 cells (i.e., 20 cells of motion at full resolution) and then warp the image so that 3 cells of motion are leftover. Then the ½ resolution might estimate +2 cell (4 cells of motion at full resolution) and warp so that 1 cell of motion is leftover. The full resolution might estimate −1 cell, so that the total motion estimated is +23. Thus each level may be responsible for estimating the residual or leftover motion. This can effectively narrow the search space, thus enabling computational efficiency in the network as the search space increases quadratically with search radius.

Some embodiments may use annotated track cuboids to auto-generate the groundtruth 2-D BeV flow in multiple scales. The system may be configured to assume that only labeled dynamic objects such as cars, bicycles and pedestrian, can have a valid velocity, and that all non-labeled obstacles and background should have zero velocity. The system may be configured to determine the ground truth flow of each annotated object by leveraging the fact that each cuboid has a unique identifier through the entire snippet sequence. Therefore, the system can use the difference in poses divided by the time elapsed between frames to determine the instantaneous ground truth velocity for each cuboid.

Let denote $\hat{f}_\theta^l$ the flow field at the lth pyramid level predicted by the network with learnable parameters θ and $f_{gt}^l$ are the corresponding groundtruth. The system can apply a multi-scale training loss:

$$\mathcal{L} = \sum_{l=l_\theta}^{L} \alpha_l \sum_x \left| \hat{f}_\theta^l - f_{gt}^l \right|_2,$$

where |·|₂ is the L2 norm of a vector, $\alpha_l$ in the training loss are set to be:

$\alpha_6=0:32$,
$\alpha_5=0:08$,
$\alpha_4=0:02$,
$\alpha_3=0:01$, and
$\alpha_2=0:005$.

In various embodiments other techniques can be used for final estimation. For example one embodiment aggregates the BeV grid motion vectors as estimated by the above-described method of FIG. 4 to compute a single mean velocity and co-variance per obstacle cluster. This may be accomplished by sampling the set of BeV motion cells occupied by the cluster.

Another embodiment uses the same approach to aggregate the BeV grid motion vectors to a mean per cluster, except each sample is weighted based on the occupancy probability of the cell. This embodiment is referred to as the FlowPillars method in Tables 1 and 2, below. The velocity vector and associated confidence per cell can be used as the observation prior for filtering the cell's velocity over time, such as with a dynamic occupancy grid.

Embodiments disclose herein may not only effectively estimate flow in 2D BeV grids but may also improve performance in both dynamic and static object tracking. Experimental results have shown that disclosed embodiments improve the performance of dynamic objects tracking using either the public dataset or a self-collected dataset. Additionally, experimental results establish that the proposed system is feasible for use in autonomous driving implementations, delivering strong improvement in generic obstacle tracking over conventional solutions.

The quantitative and qualitative results show strong enhancements to tracking performance using the velocity estimation approaches described above as set out in Tables 1 and 2. In particular, mean and worst case performance are improved across most object class types. In the Tables, the baseline approach uses a nearest neighbors (mahalanobis distance metric) based data association approach and centroid filtering.

TABLE 1

Mean Track Velocity Error In M/S

| Ground Truth Category; Integration Technique | Baseline | Dynamic Occupancy Grid | FlowPillars |
|---|---|---|---|
| Static Background Obstacles | 0.839 | 0.848 | 0.480 |
| Pedestrian and Cyclist | 0.772 | 0.523 | 0.641 |
| Obstacles observed stationary (like parked car, excluding static background) | 0.861 | 0.512 | 0.059 |
| Slow Moving Obstacles (0, 3] m/s | 0.566 | 0.570 | 0.666 |
| Fast Moving Obstacles [3, ∞) m/s | 2.396 | 2.371 | 2.036 |

TABLE 2

95th Highest Percentile Track Velocity Error In M/S

| Ground Truth Category; Integration Technique | Baseline | Dynamic Occupancy Grid | FlowPillars |
|---|---|---|---|
| Static Background Obstacles | 3.993 | 3.803 | 2.322 |
| Pedestrian and Cyclist | 3.411 | 1.621 | 1.446 |
| Obstacles observed stationary (like parked car, excluding static background) | 3.826 | 1.796 | 0.151 |
| Slow Moving Obstacles (0, 3] m/s | 2.117 | 1.709 | 1.560 |
| Fast Moving Obstacles [3, ∞) m/s | 15.188 | 11.490 | 7.468 |

In some embodiments, systems and methods may be implemented to perform bird's eye view based velocity estimation via self-supervised learning, and the scene flow estimation system may be trained using self-supervised losses. Self-supervised loss may computed using interactions between different outputs of the scene flow estimation system (e.g., forward and backward flow estimates for multiple pillar features (and at different levels of the feature pyramid)) so that data labels or feature annotations are not needed. Self-supervised learning may be accomplished via a proxy-loss that does not require ground truth labels for the training data. Embodiments may be configured to minimize the "distance" between the two or more subsequent feature-maps that are derived directly from the raw data, conditioned on the flow predicted. Based on this, the system learns to predict a BeV flow estimator that is consistent with the motion of BeV point-cloud features, without needing ground truth cuboid trajectories/labels.

In various embodiments, corresponding pillar features defined by forward and backward optical flow can be compared and the result used as supervision for the training. Some implementations may be configured to learn convolutional flow estimations without using training data that is manually annotated. The training data for the model may be autonomously labelled by identifying and exploiting the relations or correlations among multiple inputs.

In some implementations, a data aggregator can collect and aggregate data associated with the bird's eye view embeddings. Dynamic and static masks can be used for feature selection and the flows for selected features evaluated in two directions to train the estimation model. The training data can be stored in a training data repository, and may include values for the flow being predicted by the model.

Figure 5:
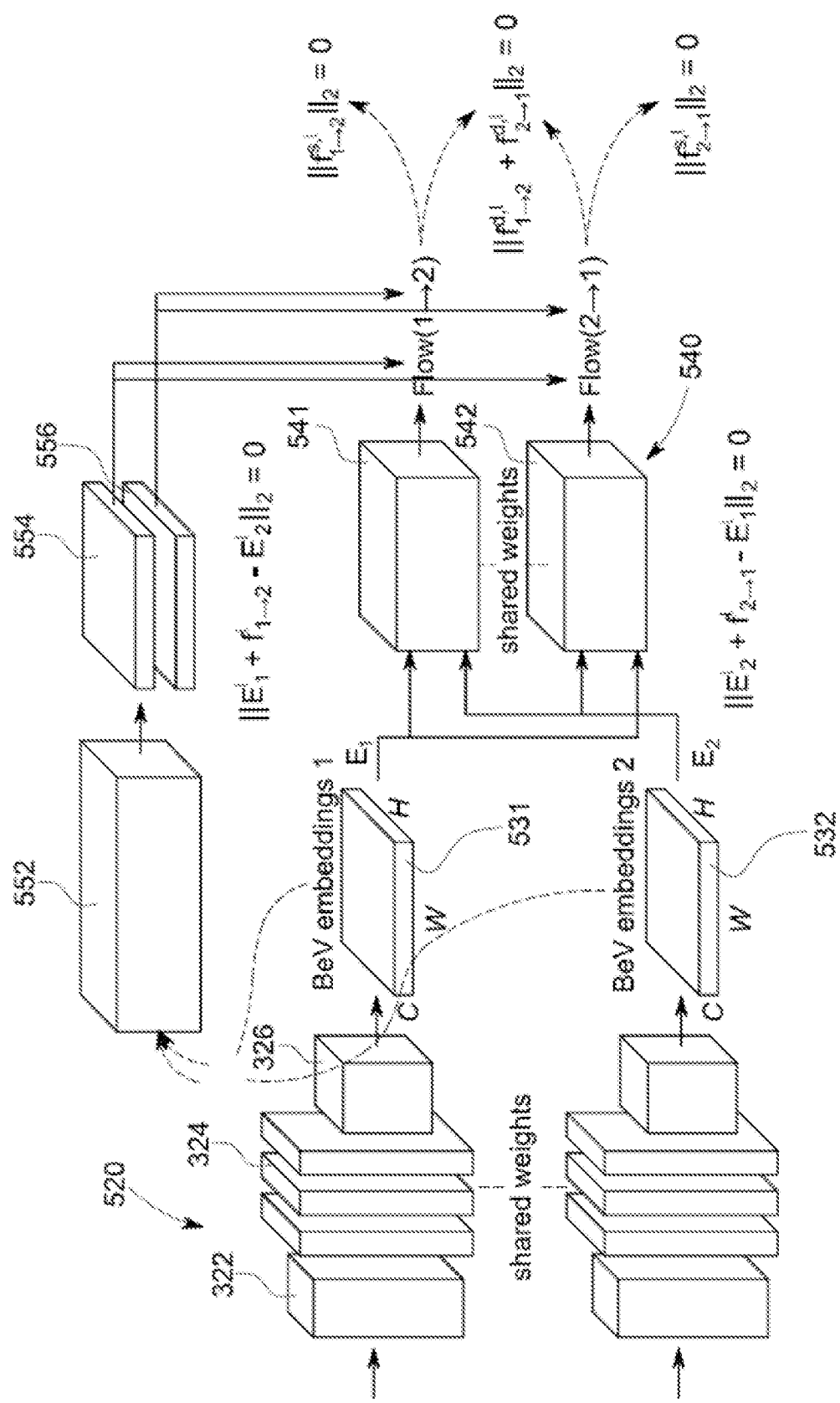
FIG. 5 is a diagram illustrating an example of velocity estimation via self-supervised learning in accordance with various embodiments.
Figure 6:
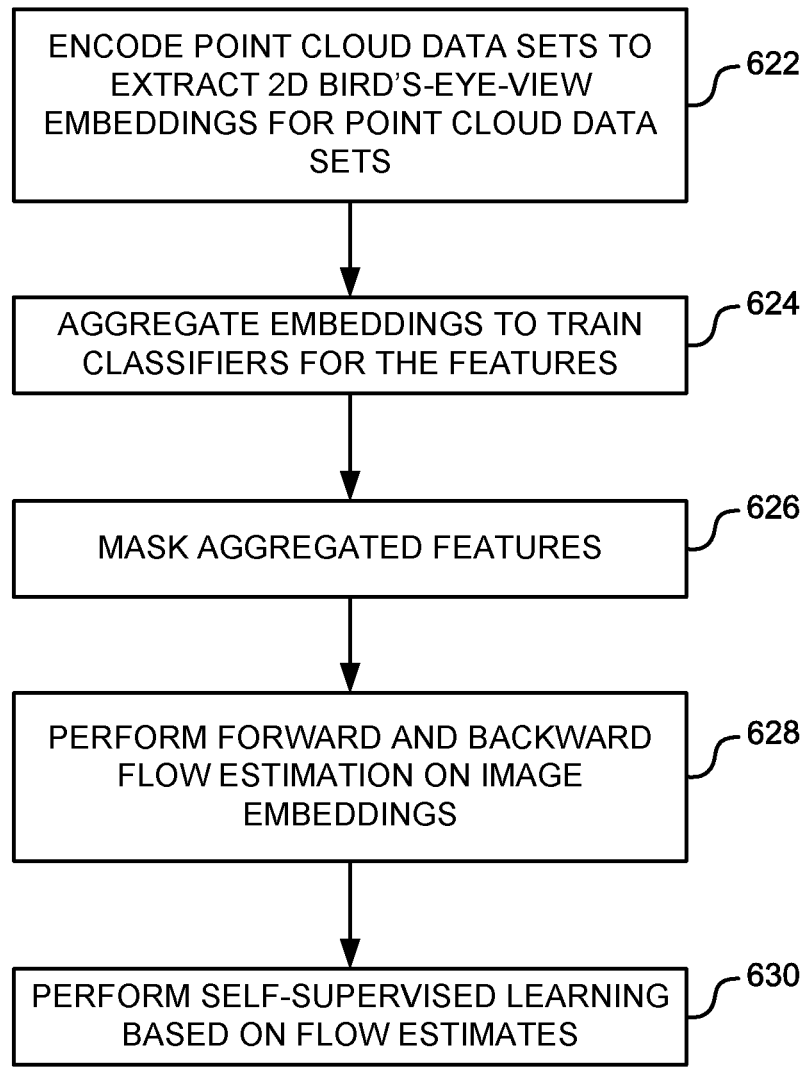
FIG. 6 illustrates an example process for velocity estimation via self-supervised learning in accordance with various embodiments.

FIG. 5 is a diagram illustrating an example of velocity estimation via self-supervised learning in accordance with various embodiments. FIG. 6 illustrates an example process for velocity estimation via self-supervised learning in accordance with various embodiments.

With reference now to FIGS. 5 and 6, This example includes a pillar feature network 520, and an optical flow network 540. In this example, the system includes two pillar feature networks 520 and two flow networks 540. This example also includes an aggregator 552, a dynamic mask 554 and a static mask 556. Pillar feature network 520 may be implemented similarly to pillar feature network 320, and as with the example of FIG. 3, pillar feature network 520 includes a voxelizer 322, a 3D classification and segmentation network 324 and a scatterplot generator 326. In various embodiments, Voxelizer 322, 3D classification and segmentation network 324 and scatterplot generator 326 perform similar functions as described above to arrive at two birds-eye view images 531, 532 having BeV embeddings (e.g., birds-eye view images 332, 334), one representing the first point cloud (e.g., the point cloud at time t−1) and one representing the second point cloud (e.g., the point cloud at time t).

Accordingly, at operation 622, the system encodes data of the point cloud data sets using pillar feature network 520 to extract two-dimensional (2D) bird's-eye-view embeddings for each of the point cloud data sets in the form of pseudo images. In some embodiments, 2D bird's-eye-view embeddings for a first of the two point cloud data sets may include pillar features for the first point cloud data set and the 2D bird's-eye-view embeddings for a second of the two point cloud data sets may include pillar features for the second point cloud data set.

At operation 624 the embeddings of the two birds-eye view images 531, 532 are aggregated to train classifiers for the features. Aggregator 552 may be configured to group similar features (in the form of pillars) together and represent them as a single feature for more efficient processing. This may allow the system to approximate the original problem with fewer-states in the form of an aggregated problem. The system may then solve the aggregated problem and "extend" its cost function to the original data set.

Aggregator 552 may be implemented as a classifier to classify the pillar features. Aggregator 552 may be, for example, a probabilistic boosting tree, support vector machine, or other machine learning classifier. Other classifiers may include, for example, single class or binary classifiers, cascaded classifiers, hierarchal classifiers, multi-class classifiers, and so on. A combination of classifiers may also be used. Multi-class classifiers may include, for example, Classification And Regression Tree (CART), K-nearest neighbor, neural network and mixture models.

Aggregator 552 receives pillar features from points of the multiple BeV images. An input vector of aggregator 552 may include some or all features directly from two birds-eye view images 531, 532 having BeV embeddings such that pillar features from the two (or more) BeV images are aggregated. In the example of FIG. 5, aggregator 552 receives all of the pillar features from the various points of all BeV images. In other embodiments, fewer than all of the pillar features from bird's-eye view images 531, 532 may be used.

At operation 626, the aggregated features are masked using a static mask 556, a dynamic mask 554, or both. Mask sizes may be fixed (e.g., based on BeV size or anticipated number of feature pillars), or sizing may dynamic to accommodate changing quantities of feature pillars. Dynamic mask 554 can be configured such that the system generates the masking pattern every time (or every x-number of times) a new data set is fed into the model. Static mask 556, on the other hand, may remain fixed for each training set.

A dynamic mask 554 may be implemented as a dynamic feature mask that is configured to identify and mask redundant features. Masking may also be performed based on importance of the features. If a feature's importance increases or decreases (e.g., independently, or relative to other features), the mask may be updated accordingly. Previously unimportant features that are now important may be unmasked and features that have lost importance may now be masked.

At operation 628, flow nets 541 and 542 perform forward and backward flow estimation. Here, two flow nets 541, 542 are provided such that flows in both the forward and the backward directions from the two bird's-eye view image embeddings can be calculated. In this example, flow net 541 calculates the flow of the feature pillars from image one to image two while flow net 542 calculates the flow of the feature pillars from image two to image one.

Although not illustrated, prior to processing with flow nets 541 and 542, the pillar features may be further encoded via a feature pyramid network (e.g., feature pyramid network 340). Feature pyramid networks may be implemented as a feature extractor for object detection operating on a pyramid of features, and may include multiple levels at different resolutions with bottom-up and top-down pathways through the levels. The bottom-up pathway is the usual convolutional network for feature extraction. Moving up the bottom-up pathway, the spatial resolution decreases, but the semantic value for each layer increases. Moving down the top-down pathway, the spatial resolution increases, but the semantic value for each layer decreases.

Embodiments may be configured to perform self-supervised learning for multiple hierarchical resolutions. In some embodiments, self-supervised learning is performed by minimizing losses for each hierarchical resolution l. Flow nets 541, 542 may be implemented to estimate the flow based on a cost function. Flow net 541 can determine the flow from one to two, $f^l_{1 \to 2}$, using the normal function:

$$\|E_1^l + f_{1 \to 2}^l - E_2^l\|_2 = 0.$$

And, flow net 542 can determine the flow from two to one, $f^l_{2 \to 1}$, using the normal function:

$$\|E_2^l + f_{2 \to 1}^l - E_1^l\|_2 = 0.$$

The flow from one to two and two to one can provide, respectively:

$$\|f_{1 \to 2}^{s,l}\|_2 = 0;$$

$$\|f_{2 \to 1}^{s,l}\|_2 = 0.$$

These can be combined as:

$$\|f_{1 \to 2}^{d,l} + f_{2 \to 1}^{d,l}\|_2 = 0.$$

Where s represents static objects and d represents dynamic objects.

Figure 7:
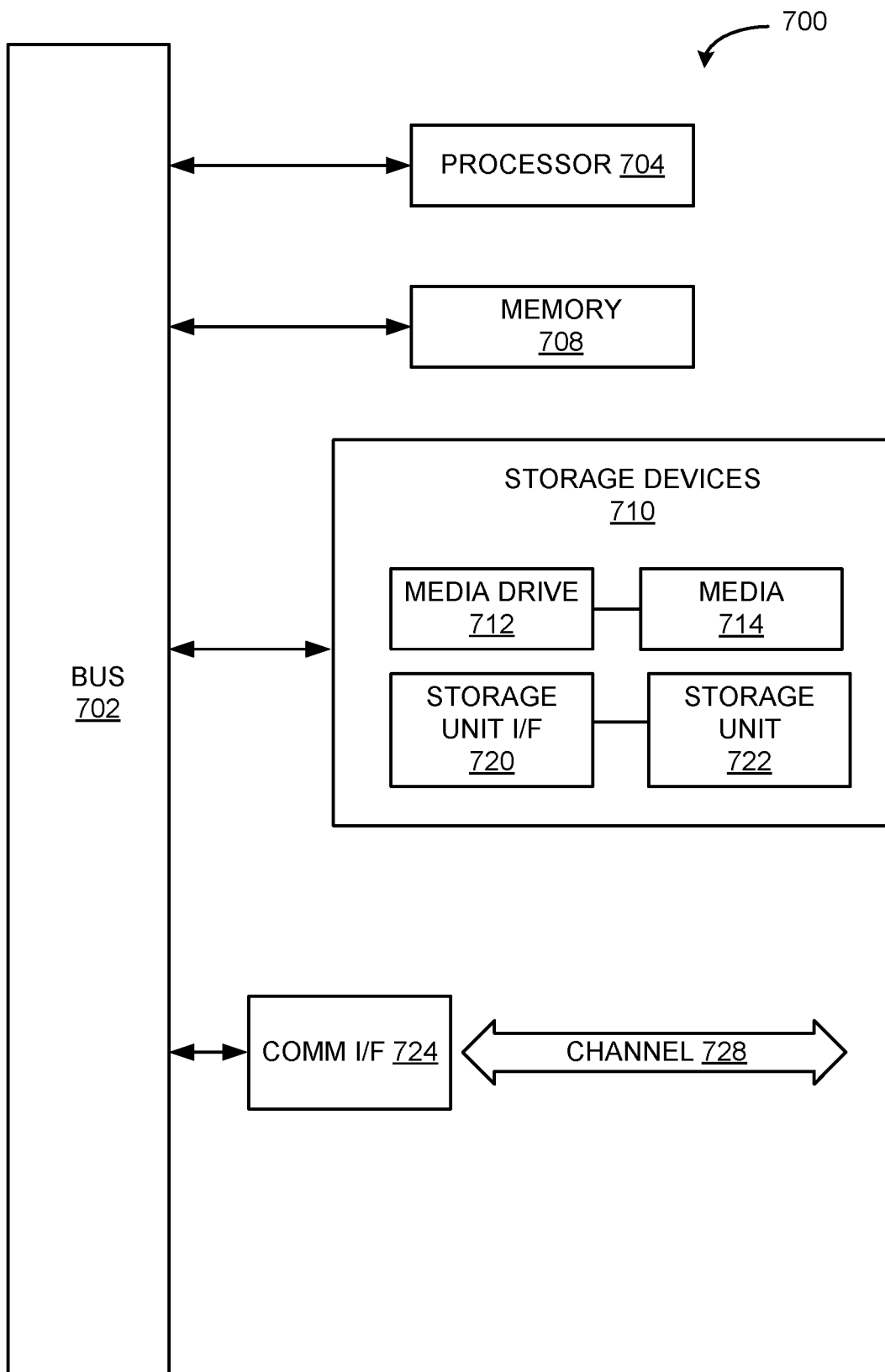
FIG. 7 is an example computing component that may be used to implement various features of embodiments described in the present disclosure.

At operation 630, the system performs self-supervised learning based on the flow estimates. As noted, self-supervised learning is performed by minimizing the cost function for each of a plurality of hierarchical resolutions l, which can be derived from a feature pyramid. The system can be configured to perform a check of the consistency between the forward and backward flows and compute a consistency loss. The system may also compute bidirectional image-based losses by comparing BeV image 531 to backward warped BeV image 532 and BeV image 532 to backward warped BeV image 531. This may be performed, in some embodiments, using bilinear sampling. The data loss can be computed based on the forward-backward consistency and the warped images for each point in the images. Accordingly, the system may be configured to train the machine learning model using a minimal or reduced training data set.

Where embodiments of the system are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for determining velocity of an object associated with a three-dimensional (3D) scene, the method comprising:
   receiving two sets of 3D point cloud data of the scene from two consecutive point cloud sweeps;
   aligning the two consecutive point cloud data sets into the same coordinate frame;
   encoding data of the point cloud data sets using a pillar feature network to extract two-dimensional (2D) bird's-eye-view embeddings for each of the point cloud data sets in the form of pseudo images, wherein the 2D bird's-eye-view embeddings for a first of the two point cloud data sets comprises pillar features for the first point cloud data set and the 2D bird's-eye-view embeddings for a second of the two point cloud data sets comprises pillar features for the second point cloud data set; and
   encoding the pillar features using a feature pyramid network and performing a 2D optical flow estimation to estimate the velocity of the object.

2. The method of claim 1, further comprising applying a contextual network to use contextual information to refine the velocity estimate.

3. The method of claim 2, wherein the context network is a feedforward CNN based on dilated convolutions.

4. The method of claim 1, wherein receiving two sets of 3D point cloud data of the scene comprises receiving the first point cloud data set by a first pillar feature network and receiving a second point cloud data set by a second pillar feature network, wherein the first point cloud data set represents the scene at a time t−1 and the second point cloud data set represents the scene at a time t subsequent to the time t−1.

5. The method of claim 1, wherein encoding data of the point cloud data sets comprises voxelizing the point cloud data sets to render surfaces in the data sets onto a grid of discretized volume elements in a 3D space to create a set of pillars.

6. The method of claim 5, wherein the set of pillars comprise a (D, P, N) shape tensor in which P is the number of pillars and N denotes the number of points per pillar.

7. The method of claim 5, further comprising encoding voxel information from the voxelizing to extract the features of the point cloud data sets.

8. The method of claim 7, further comprising scattering the encoded features back to their original pillar locations to create the bird's-eye-view.

9. The method of claim 1, wherein the 2D optical flow estimation comprises warping the pseudo image of the first point cloud data set to align the pseudo image of the first point cloud data set with the pseudo image of the second point cloud data set.

10. The method of claim 9, wherein the 2D optical flow estimation further comprises computing a cost function of the warped pseudo image of the first point cloud data set and the pseudo image of the second point cloud data set, by identifying displacement of a feature from the first image to the second image.

11. The method of claim 10, wherein the 2D optical flow estimation further comprises using the cost function to estimate the flow of the object.

12. The method of claim 1, wherein performing a 2D optical flow estimation to estimate the velocity of the object comprises aggregating bird's eye view motion vectors to compute a single mean velocity and co-variance for each obstacle cluster.

13. The method of claim 12, wherein a sample is weighted based on an occupancy probability of the cell to which the sample belongs.

14. The method of claim 1, wherein estimated velocity of the object is a 2-D flow vector for the object.

15. The method of claim 1, further comprising using annotated track cuboids to auto-generate the 2D flow in multiple scales.

16. The method of claim 1, further comprising performing flow estimation only on labeled dynamic objects and not performing flow estimation on non-labeled obstacles or background objects.

17. The method of claim 1, wherein the method is performed using three or more sets of 3D point cloud data of the scene, including aligning all of the point cloud data sets into the same coordinate frame, encoding data of each of the point cloud data sets using a pillar feature network to extract two-dimensional (2D) bird's-eye-view embeddings for each of the point cloud data sets comprising pillar features for each point cloud data set, and encoding the pillar features using a feature pyramid network and performing a 2D optical flow estimation to estimate the velocity of the object.

18. The method of claim 1, wherein encoding the pillar features using a feature pyramid network further includes using 2D map information as an additional channel input to the feature pyramid network.

19. The method of claim 1, further comprising filtering the point cloud datasets using a ground height map, wherein the filtering comprises comparing data point heights against ground height and discarding a data point whose point height is not greater than the ground height at the point's location.

20. A system for determining velocity of an object associated with a three-dimensional (3D) scene, the system comprising:
a non-transitory memory configured to store instructions;
at least one processor configured to execute the instructions to perform the operations of:
receiving two sets of 3D point cloud data of the scene from two consecutive point cloud sweeps;
aligning the two consecutive point cloud data sets into the same coordinate frame;
encoding data of the point cloud data sets using a pillar feature network to extract two-dimensional (2D) bird's-eye-view embeddings for each of the point cloud data sets in the form of pseudo images, wherein the 2D bird's-eye-view embeddings for a first of the two point cloud data sets comprises pillar features for the first point cloud data set and the 2D bird's-eye-view embeddings for a second of the two point cloud data sets comprises pillar features for the second point cloud data set; and
encoding the pillar features using a feature pyramid network and performing a 2D optical flow estimation to estimate the velocity of the object.

* * * * *